United States Patent
Fujikawa et al.

(10) Patent No.: US 6,524,004 B2
(45) Date of Patent: Feb. 25, 2003

(54) EXTERNALLY PRESSURIZED GAS BEARING SPINDLE ASSEMBLY

(75) Inventors: Yoshio Fujikawa, Shizuoka (JP); Takayuki Itoh, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/136,392

(22) Filed: May 2, 2002

(65) Prior Publication Data

US 2002/0122608 A1 Sep. 5, 2002

Related U.S. Application Data

(62) Division of application No. 09/654,509, filed on Sep. 1, 2000, now Pat. No. 6,439,773.

(30) Foreign Application Priority Data

| Sep. 2, 1999 | (JP) | 11-249008 |
| Nov. 8, 1999 | (JP) | 11-316882 |
| Nov. 9, 1999 | (JP) | 11-318284 |
| Jun. 16, 2000 | (JP) | 2000-180959 |

(51) Int. Cl.$^7$ ............................................. F16C 32/06
(52) U.S. Cl. ...................................... 384/100; 384/121
(58) Field of Search ........................ 384/107, 110–113, 384/121, 100, 119, 124, 130, 131, 132, 134; 277/432

(56) References Cited

U.S. PATENT DOCUMENTS

| 3,493,273 A | 2/1970 | Greenberg | 384/111 |
| 4,245,844 A * | 1/1981 | Pohl et al. | 277/432 |
| 4,417,823 A | 11/1983 | Drevet et al. | 384/111 |
| 4,726,689 A * | 2/1988 | Pollock | 384/132 |
| 4,749,283 A * | 6/1988 | Yokomatsu et al. | 384/12 |
| 4,822,182 A | 4/1989 | Matsushita et al. | 384/107 |
| 4,836,692 A | 6/1989 | Hagen | 384/109 |
| 5,073,037 A | 12/1991 | Fujikawa et al. | 384/107 |
| 5,218,896 A * | 6/1993 | Furukawa | 384/12 |
| 5,239,892 A | 8/1993 | Sakai | 384/107 |
| 5,795,073 A | 8/1998 | Arvidsson et al. | 384/107 |
| 6,019,515 A | 2/2000 | Fujii et al. | 384/107 |

FOREIGN PATENT DOCUMENTS

JP 63-174802 7/1988

* cited by examiner

*Primary Examiner*—Thomas R. Hannon
(74) *Attorney, Agent, or Firm*—Wenderoth, Lind & Ponack, L.L.P.

(57) ABSTRACT

A compact externally pressurized gas bearing spindle assembly can increase the degree of vacuum in a vacuum chamber. In a spindle assembly wherein a rotary shaft is provided in a housing through a bearing gap, and compressed gas is introduced into the bearing gap to support the rotary shaft in a non-contact manner relative to the housing, an exhaust gas suction device for sucking gas discharged from the bearing gap is provided inside the housing or the rotary shaft. The bearing gap near the outside of the housing is smaller than the other bearing gap. Near the bearing gap near the outside of the housing, a non-contact seal gap is formed to prevent leakage of compressed gas into the vacuum chamber in a non-contact manner.

21 Claims, 17 Drawing Sheets

EXTERNALLY PRESSURIZED GAS BEARING SPINDLE ASSEMBLY

This application is a divisional application of application Ser. No. 09/654,509, filed Sep. 1, 2000 now U.S. Pat. No. 6,439,773

BACKGROUND OF THE INVENTION

The present invention relates to an externally pressurized gas bearing spindle assembly that allows highly accurate rotation of the spindle in a vacuum, reduced pressure or other special atmosphere.

The spindle assembly has a rotary shaft rotatably mounted in a housing through bearing gaps. During operation, compressed air or gas is introduced into the bearing gaps to support the rotary shaft while keeping it out of contact with the housing. The gas bearing structure thus allows high-precision rotation of the rotary shaft and ensures high endurance of the spindle assembly. Such a spindle assembly is therefore especially useful in high-precision machining, or in semiconductor processing.

Since e.g. optical disc masters are expected to be processed in a vacuum for higher accuracy and recording density, a gas bearing spindle assembly must be placed in a vacuum chamber. Thus, it is necessary to provide the spindle assembly with means for keeping compressed air used for the bearing from leaking into the vacuum chamber and decreasing the degree of vacuum.

As such means, a spindle assembly with a non-contact seal arrangement is proposed in Japanese patent publication 63-174802 to keep the rotational accuracy of the spindle in a vacuum or under reduced pressure while minimizing leakage of gas from the gas bearing into the vacuum chamber.

This type of non-contact seal arrangement includes a plurality of exhaust grooves formed in the inner surface of the bearing housing near its end. In order to positively prevent gas from leaking into the vacuum chamber, a plurality of exhaust pumps are connected to the respective exhaust grooves to draw gas that has flowed from the bearing gap into the respective exhaust grooves, to the open air outside the vacuum chamber.

However, in order to increase the degree of vacuum with a conventional spindle assembly, a plurality of exhaust pumps are needed to discharge the gas used for bearings. This increases the required installation space and the running cost. The spindle assembly is often mounted on a linear positioning table. In such a case, a plurality of tubes connecting the exhaust pumps to the respective exhaust grooves are needed and they would become a major obstacle in positioning the spindle. The more the tubes, the greater the resistance offered by the tubes and the more the positioning accuracy decreases.

The narrower the non-contact seal gap, the larger the flow resistance it imposes and the more effectively it can reduce leakage of gas into the vacuum chamber. But forming a narrow seal gap requires extremely high dimensional accuracy of the parts and thus incurs higher cost.

An object of the present invention is therefore to provide an externally pressurized gas bearing spindle assembly that can minimize leakage of gas using a minimum number of exhaust pumps and without the need to narrow the non-contact seal gap so extremely.

SUMMARY OF THE INVENTION

According to this invention, in an externally pressurized gas bearing spindle assembly wherein a rotary shaft is provided in a housing through bearing gaps, and wherein compressed gas is introduced into the bearing gaps to support the rotary shaft in a non-contact manner relative to the housing, an exhaust gas suction device for sucking gas discharged from the bearing is provided in the housing.

Since compressed gas leaking from the bearing gap toward the outside of the housing is sucked by the exhaust gas suction device, it is possible to minimize the leakage of gas into the vacuum chamber in a non-contact manner.

As another embodiment, the exhaust gas suction device may be provided in the rotary shaft.

As the exhaust gas suction device, a negative pressure generator, which generates negative pressure by the flow of compressed gas, may be used. By communicating the gas supply passage and the exhaust passage for the negative pressure generator with a compressed gas supply passage for introducing compressed gas into the bearing gap and a discharge passage for guiding exhaust gas from the bearing gap to the outside, respectively, no additional passageway is necessary for gas supply and exhaust for the negative pressure generator. Thus an externally pressurized gas bearing spindle assembly is obtained which is more compact and accurate and can be used in a vacuum.

The negative pressure generated by the negative pressure generator will be sufficient if only exhaust gas from the bearing gap can be effectively sucked.

According to this invention, there is provided a spindle assembly further comprising a plurality of non-contact seal gaps provided between the rotary shaft and the stationary portion so as to communicate with a gas discharge end of the bearing gap, a first exhaust groove formed between the gas discharge end of the bearing gap and the non-contact seal gap, and a second exhaust groove formed between the adjacent non-contact seal gaps to form a labyrinth seal between the rotary shaft and the stationary member. The labyrinth seal structure effectively suppresses leakage of gas into the chamber in which is placed the spindle assembly.

The first exhaust groove may communicate with the outside of the vacuum chamber with at least one of the other exhaust grooves communicating with the exhaust gas suction device, or alternatively the first exhaust groove may communicate with the exhaust gas suction device. This arrangement effectively minimizes leakage of gas into the chamber in which is placed the spindle assembly.

The other of the exhaust grooves may communicate with an exhaust pump provided outside of the vacuum chamber to forcibly discharge the exhaust gas from the seal gap. This makes it possible to minimize the leakage of gas into the vacuum chamber.

Further, as another means for solving the above problems, according to this invention, there is provided a spindle assembly wherein two externally pressurized gas bearings for supporting the rotary shaft at least in an axial direction in a non-contact manner are provided in the housing, wherein among the two bearings, the gap of the one nearer to the outside of said housing is smaller than that of the other, and wherein a non-contact seal gap is formed close to the gas bearing near the outside of the housing to prevent exhaust gas from the gas bearings from leaking into the outside of the housing. In this case, externally pressurized gas bearings for radial support of the rotary shaft may be provided as necessary.

The rotary shaft is rotated with high accuracy by e.g. an electric motor while kept out of contact with a stationary part by externally pressurized gas bearings with one end thereof exposed to a special atmosphere such as a vacuum.

A seal gap provided close to the gas bearing at the side exposed to the special atmosphere may be formed between flat surfaces perpendicular to the rotary shaft or between conical surfaces coaxial with the rotary shaft. As the rotary shaft moves axially, the seal gap changes.

Among the two bearings for axial support of the rotary shaft, the one nearer to the seal gap has a smaller gap and so larger stiffness than the other by adjusting the supply pressure and various bearing specifications. With this arrangement, any dimensional variation due to machining and assembling errors or thermal deformation is absorbed by a change in the size of the bearing gap of the gas bearing having a smaller stiffness. Thus, the bearing gap of the gas bearing near the seal gap is scarcely influenced. Thus, even though the seal gap is narrower than conventional ones, it is maintained stably.

DETAILED DESCRIPTION OF THE PREFERRED EMBODIMENTS

Figure 1:
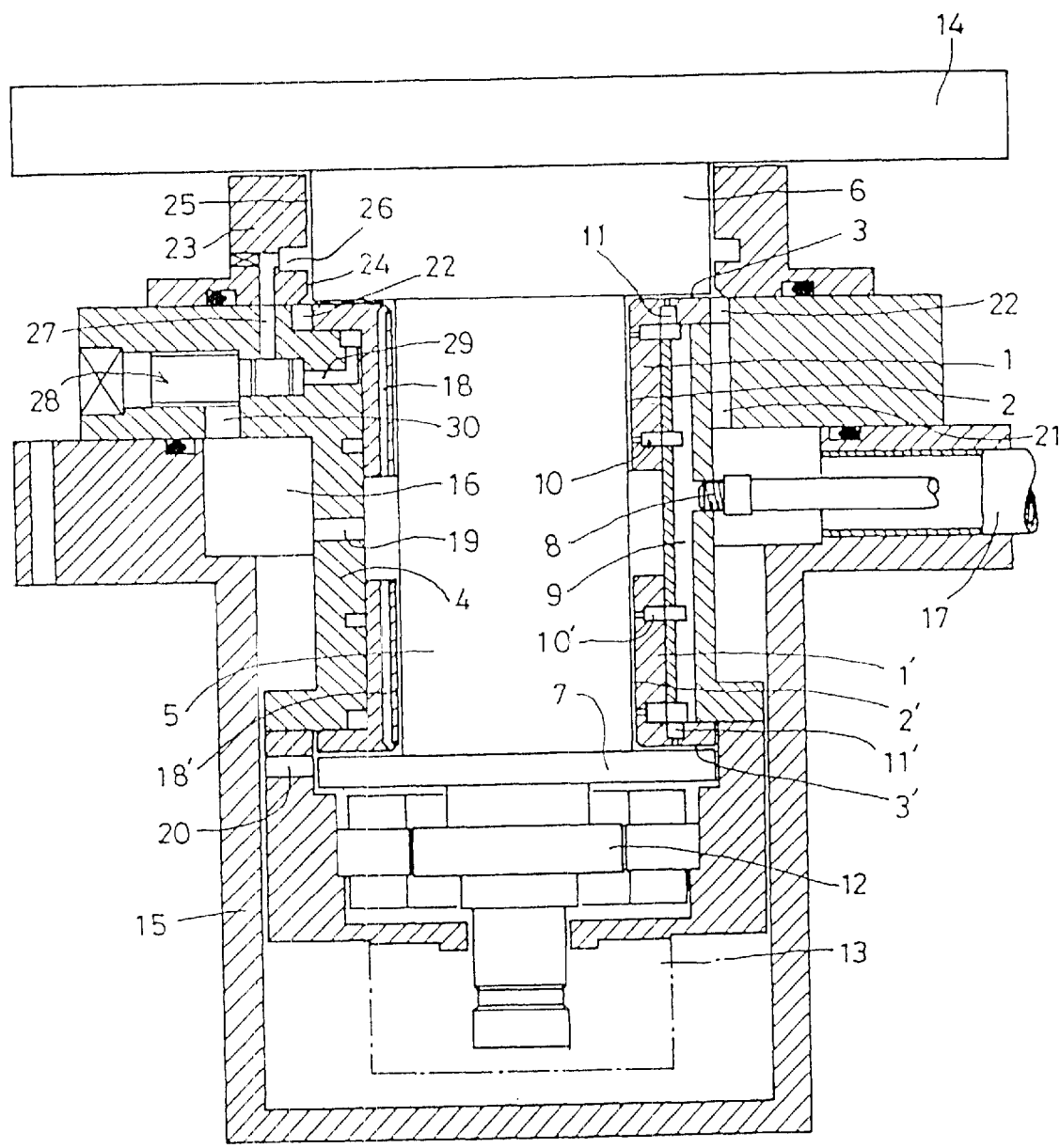
FIG. 1 is a sectional view of a spindle assembly with a static gas bearing embodying this invention.

FIG. 1 shows the first embodiment of a spindle assembly with an externally pressurized gas bearing.

The spindle assembly includes a housing 4 and bearing sleeves 1, 1' fixedly mounted in the housing 4 so as to be coaxial with each other and having inner coaxial cylindrical journal bearing surfaces 2, 2' and thrust bearing surfaces 3, 3' at their ends remote from each other. A rotary shaft 5 inserted in the sleeves 1, 1' carries thrust plates 6, 7 at opposite ends to form a rotary portion.

The outer surface of the rotary shaft 5 faces the bearing surfaces 2, 2' through small journal bearing gaps and the inner surfaces of the thrust plates 6, 7 face the respective thrust bearing surfaces 3, 3' through small thrust bearing gaps.

The housing 4 is formed with an axial gas passage 9 communicating with a compressed gas supply port 8. Each of the sleeves 1, 1' is formed with rows of orifices 10 and 11 or 10' and 11' through which annular grooves of the housing 4 communicate with the journal and thrust bearing gaps between the sleeves 1, 1' and the rotary shaft 5.

Thus, compressed gas supplied from the supply port 8 flows through the passage 9, annular grooves and orifices into the bearing gaps between the sleeves 1, 1' and the rotary portion to support the rotary shaft while keeping it out of contact with the sleeves.

The rotary shaft 5 carries a rotor 12 of an electric motor at its bottom side. The motor includes a stator surrounding the rotor. The motor is controlled based on a signal from a rotation angle detector 13 to rotate the rotary shaft 5 with precision. The thrust plate 6 carries a turntable 14 on which a workpiece is mounted.

The housing 4 is airtightly received in an airtight case 15 to define an annular exhaust space 16 therebetween. The space 16 communicates with the exterior of a vacuum chamber in which the spindle is placed, through a bellows tube 17 and is kept at the atmospheric pressure. Compressed gas introduced into the bearing gaps between the sleeves 1, 1' and the rotary shaft flows through exhaust passages 18, 18', 19, 20, 21 into the exhaust space 16 and discharged outside the vacuum chamber through the bellows tube 17. A compressed gas supply tube, and cables for the motor and the rotation angle detector, etc. are introduced through the bellows tube 17.

Compressed gas introduced into the gap between the thrust plate 6 and the thrust bearing surface 3 of the sleeve 1 and a first exhaust groove 22 partially flows through a first narrow seal gap 24 defined between the radially inner surface of a seal member 23 and the radially outer surface of the thrust plate 6 into a second exhaust groove 26. The gas leaking into the groove 26 is mostly drawn into a negative pressure generator 28 through an exhaust passage 27 and discharged. The gas in the groove 26 scarcely leaks through a gap 25 into the vacuum chamber because the gap 25 is narrow and thus offers high flow resistance.

Since the spindle assembly itself has a built-in negative pressure generator 28, the distance between the generator 28 and the second exhaust groove 26 is far shorter than the distance between the groove 26 and an external pump used as an exhaust gas suction means in a conventional arrangement. This means that the gas flow resistance is far smaller and thus gas can be discharged with sufficient efficiency even by a small negative pressure generator.

A radial passage such as one connecting the second exhaust groove 26 with the exhaust passage 27 can be easily formed by drilling a radial hole in the radially outer surface of the seal member 23 and airtightly closing its radially outer portion with a plug.

Negative pressure is produced in the negative pressure generator 28 by compressed gas supplied from the port 8 through a branch passage 29 branching from one of the annular grooves formed in the housing 4. The negative pressure thus produced draws gas in the second exhaust groove 26 into the negative pressure generator 28 and discharges it into the exhaust space 16 through an exhaust passage 30.

Figure 2:
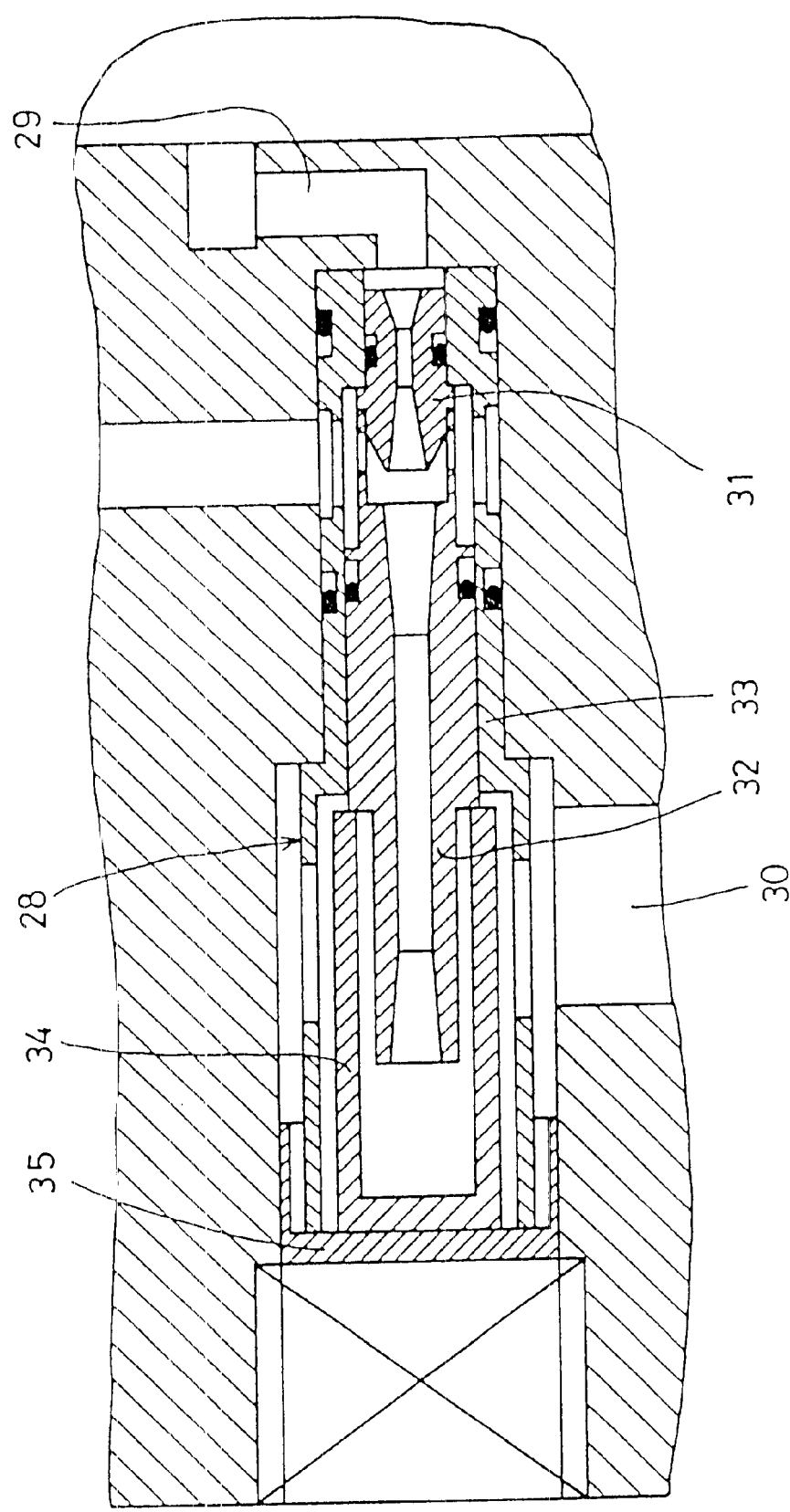
FIG. 2 is an enlarged view of a negative pressure generator mounted in the spindle assembly of FIG. 1.

As shown in FIG. 2, the negative pressure generator 28 has a nozzle 31 and a diffuser 32 fitted in a case 33 through O-rings and held in position by a lid 35 through a silencer filter 34.

The rotary shaft 5 forming a spindle can thus be supported in a non-contact manner and can be rotated with high accuracy in a vacuum chamber.

Built in the housing, the negative pressure generator 28 eliminates the necessity of providing an external discharge pump and thus makes it possible to reduce the size of the entire device as well as its cost. Also, this eliminates the need for a tube connecting to an external pump, thus minimizing undue effects on the positioning accuracy.

The silencer filter 34 and the O-rings reduce vibration and noise resulting from gas flow in the nozzle 31, thereby minimizing runout of the spindle or rotary shaft. The silencer filter 34 may be made of e.g. a gas-permeable porous sintered metal, or porous resin, or a mass of synthetic fiber, and is preferably made of a resilient material so that the negative pressure generator can be supported resiliently to further suppress vibrations.

In the embodiment of FIG. 1, most of exhaust gas is discharged into the exhaust space 16 through the exhaust passage 21 and partially drawn into the negative pressure generator 28 through the first seal gap 24, exhaust groove 26 and exhaust passage 27. But, provided the negative pressure generator 28 is powerful enough with respect to the amount of gas discharged and the degree of vacuum required for the vacuum chamber, gas discharged from the bearing gap may be entirely drawn into the negative pressure generator 28 directly through the exhaust groove around the bearing with the first exhaust groove 22 and the first seal gap 24 omitted.

The exhaust grooves and passages are all formed in the stationary side in this embodiment. But they may be formed in the rotary side to achieve the same effects.

Figure 3:
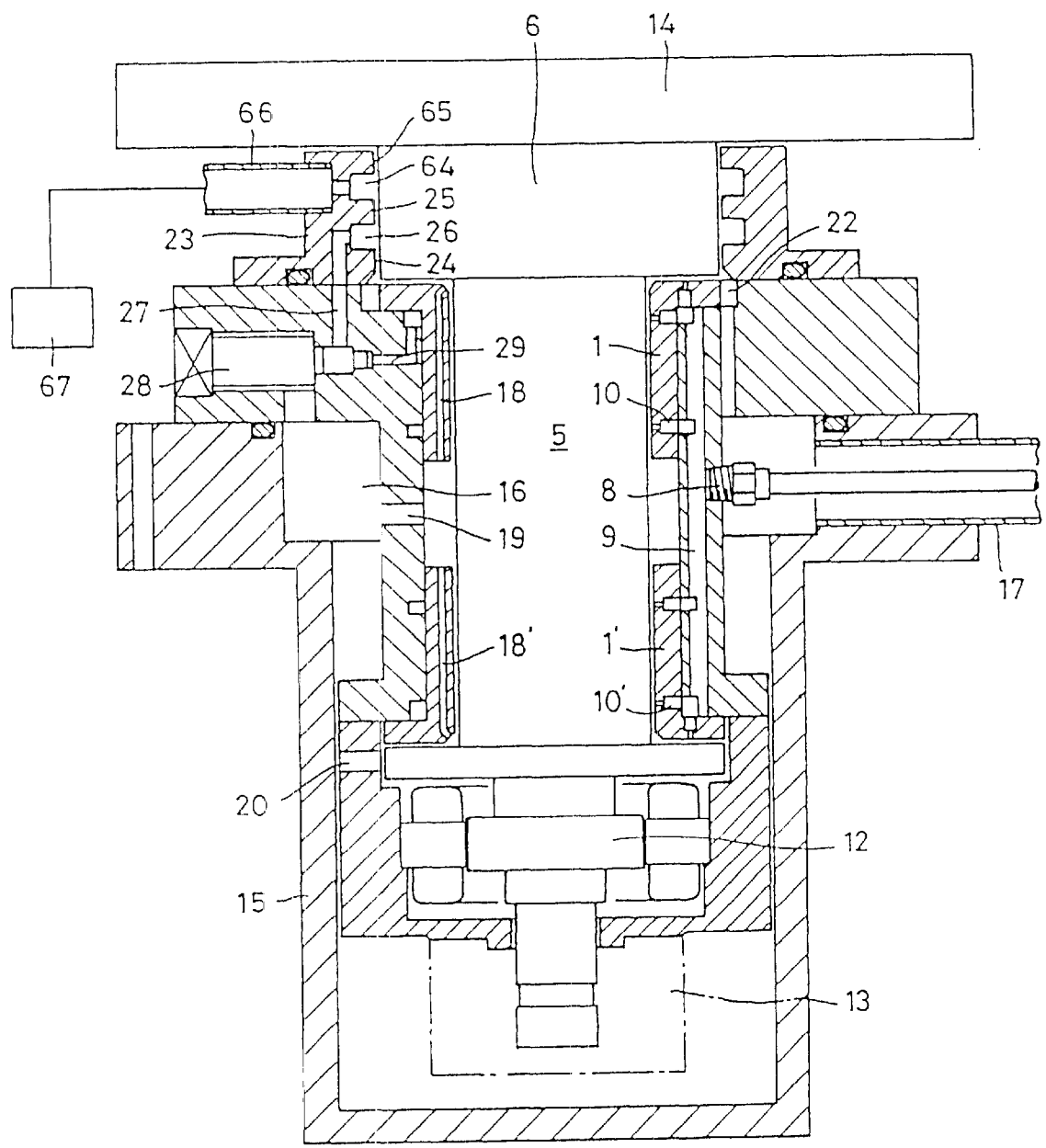
FIGS. 3 to 8 are sectional views of spindle assemblies of different embodiments according to the present invention.

FIG. 3 shows another embodiment. The only difference between this embodiment and the embodiment of FIG. 1 is the number of seal gaps and exhaust grooves formed between the thrust plate 6 and the seal 23. Other elements are identical to those in the embodiment of FIG. 1.

Specifically, in this embodiment, the second seal gap 25 communicates with the vacuum chamber through a third exhaust groove 64 and a third seal gap 65 defined between the thrust plate 6 and the seal member 23. The third exhaust groove 64 is connected to a discharge pump 67 provided outside the vacuum chamber through a bellows joint 66 connected to the seal member 23 to forcibly discharge gas flowing into the third exhaust groove 64 out of the vacuum chamber.

This labyrinth seal structure formed between the thrust plate 6 and the seal member 23 increases the flow resistance and thus minimizes the amount of gas flowing into the third exhaust groove 64, and the discharge pump 67 forcibly discharges gas that has flowed into the groove 64. Thus, it is possible to minimize leakage of gas into the vacuum chamber.

Thus, compared with a conventional arrangement, it is possible to reduce the operating cost and the required installation space because only a single discharge pump is needed. Also, since only one tube is needed to connect the third exhaust groove 64 with the exhaust pump 67, resistance by the tube is minimum when the spindle assembly is positioned on e.g. a linear positioning table. The spindle assembly can thus be positioned with high accuracy.

Figure 4:
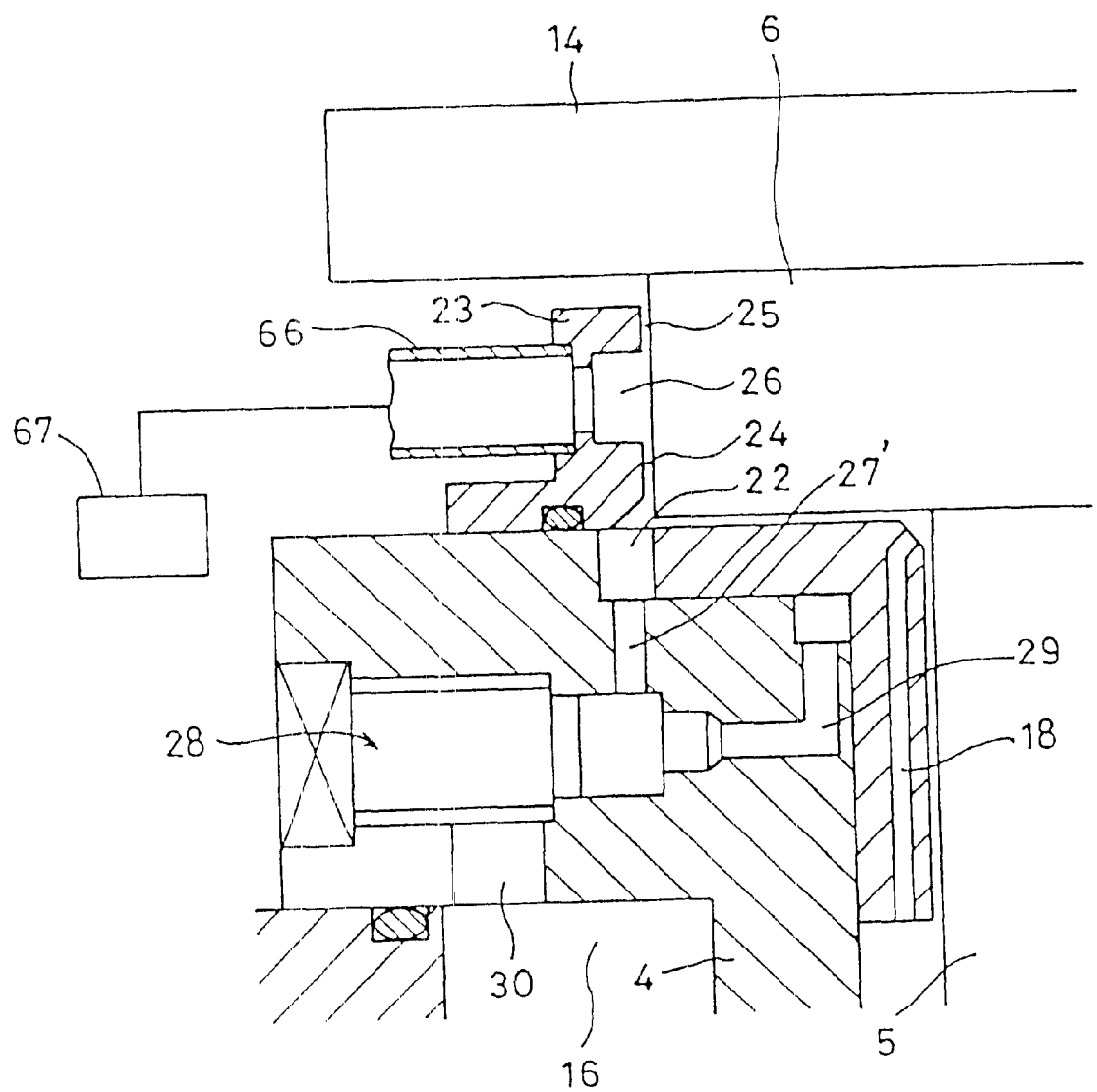

FIG. 4 shows a further embodiment in which the first exhaust groove 22, first seal gap 24, second exhaust groove 26 and second seal gap 25 are arranged in exactly the same manner as in the embodiment of FIG. 1. The first exhaust groove 22 communicates with the negative pressure generator 28 through an exhaust passage 27'. The second exhaust groove 26 is connected to a discharge pump 67 provided outside the vacuum chamber through a bellows joint 66.

Otherwise, this embodiment is structurally identical to the embodiment of FIG. 1.

With this arrangement, gas entering into the first exhaust groove 22 from the bearing gap is mostly drawn into the negative pressure generator 28, and gas that may flow into the second exhaust groove 26 through the first seal gap 24 is discharged by the discharge pump 67. Thus, it is possible to minimize the leakage of gas into the vacuum chamber.

Also, it is possible to reduce the operating cost and the required installation space because a single exhaust pump 67 is used. When the spindle assembly is mounted on e.g. a linear positioning table, it can thus be positioned with high accuracy.

Figure 5:
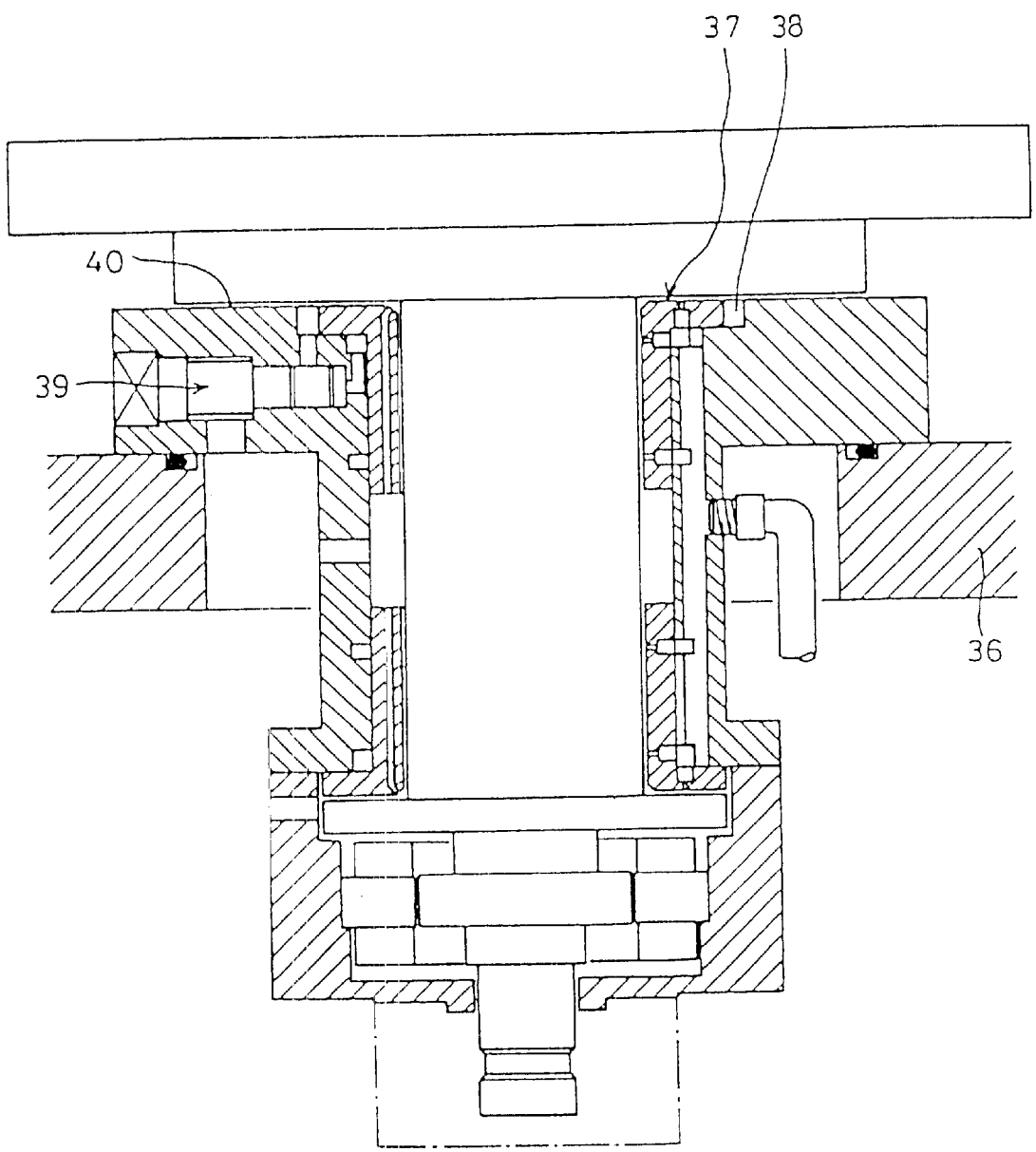

FIG. 5 shows a further embodiment in which the spindle assembly is fixed to an outer wall 36 of a vacuum chamber with only the upper half portion (on the turntable side) received in the vacuum chamber and its motor side portion out of the vacuum chamber. An exhaust groove 38 is provided around a thrust bearing 37. Gas flowing from the thrust bearing 37 into the exhaust groove 38 is drawn into a negative pressure generator 39 and discharged into the atmosphere outside the vacuum chamber. In order to minimize leakage of gas from the exhaust groove 38 into the vacuum chamber, a seal gap 40 is provided radially outside of the gap of the thrust bearing 37.

Since both the seal gap 40 and the bearing gap of the thrust bearing are defined by a common pair of flat surfaces, a narrow seal gap can be formed far more easily than in the arrangement of the embodiment of FIG. 1 or in the prior art in which a separate seal member is used. Thus, it minimizes leakage of gas into the vacuum chamber. Since the amount of gas leakage into the vacuum chamber is smaller, it is possible to create a higher degree of vacuum in the vacuum chamber. Also, it is possible to create a required degree of vacuum in the vacuum chamber with a less powerful, smaller, less expensive vacuum pump. Since the axial dimension of the seal portion is shorter, the distance between the turntable and the bearing portion of the rotary shaft is shorter. This makes it possible to turn the turntable with higher accuracy.

Figure 6:
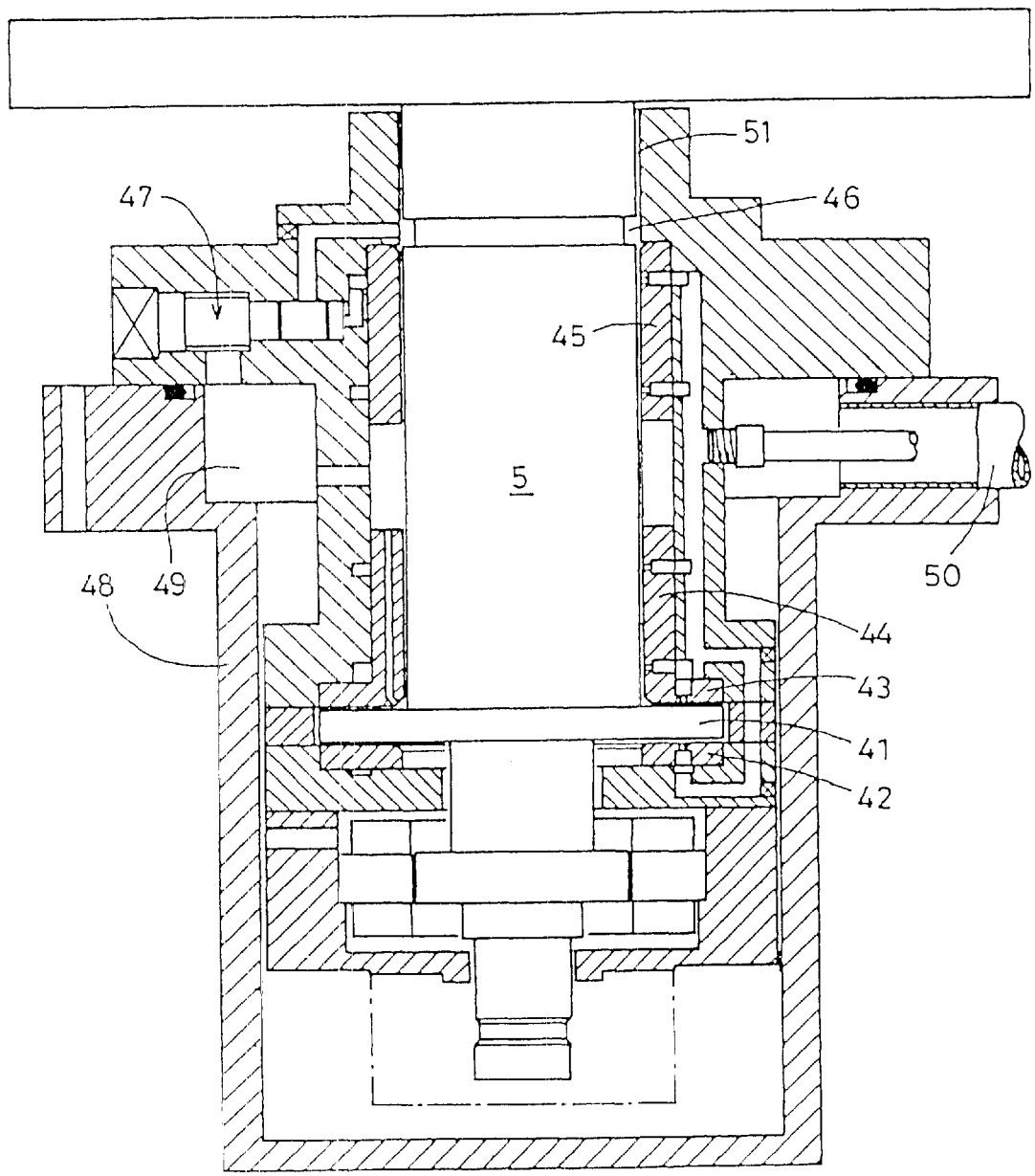

FIG. 6 shows a still further embodiment in which the rotary shaft 5 carries a thrust plate 41 having its end faces axially supported on thrust bearings 42 and 43. The rotary shaft 5 is radially supported by journal bearings 44, 45.

Gas in the gap between the journal bearing 45 and the rotary shaft 5 partially flows into an exhaust groove 46. Gas in the exhaust groove 46 is drawn by a negative pressure generator 47 into an exhaust space 49 defined between a case 48 and the spindle housing and through a bellows joint 50 to outside of the vacuum chamber. A seal gap 51 limits the amount of gas leaking through the groove 46 toward the vacuum chamber.

The seal gap 51 is defined between the outer cylindrical surface of the rotary shaft 5 and a fixed member having an inner cylindrical surface that forms a common cylindrical bore in cooperation with the inner cylindrical surfaces of the journal bearings 44, 45. Thus, the gap 51 can be formed with high accuracy and made sufficiently narrow. As in the embodiment of FIG. 5, gas leakage through the seal gap 51 is thus minimized. The seal gap 51 is smaller in diameter and circumference than the seal gaps 24, 25 of the embodiments of FIGS. 1 to 5 because the former is formed around the rotary shaft 5 while the latter is formed around the thrust plate 6. Thus, the gap 51 offers a larger flow resistance and more effectively prevents air leakage. To further increase the seal performance, the portion of the rotary shaft 5 where the gap 51 is formed may have a reduced diameter.

Figure 7:
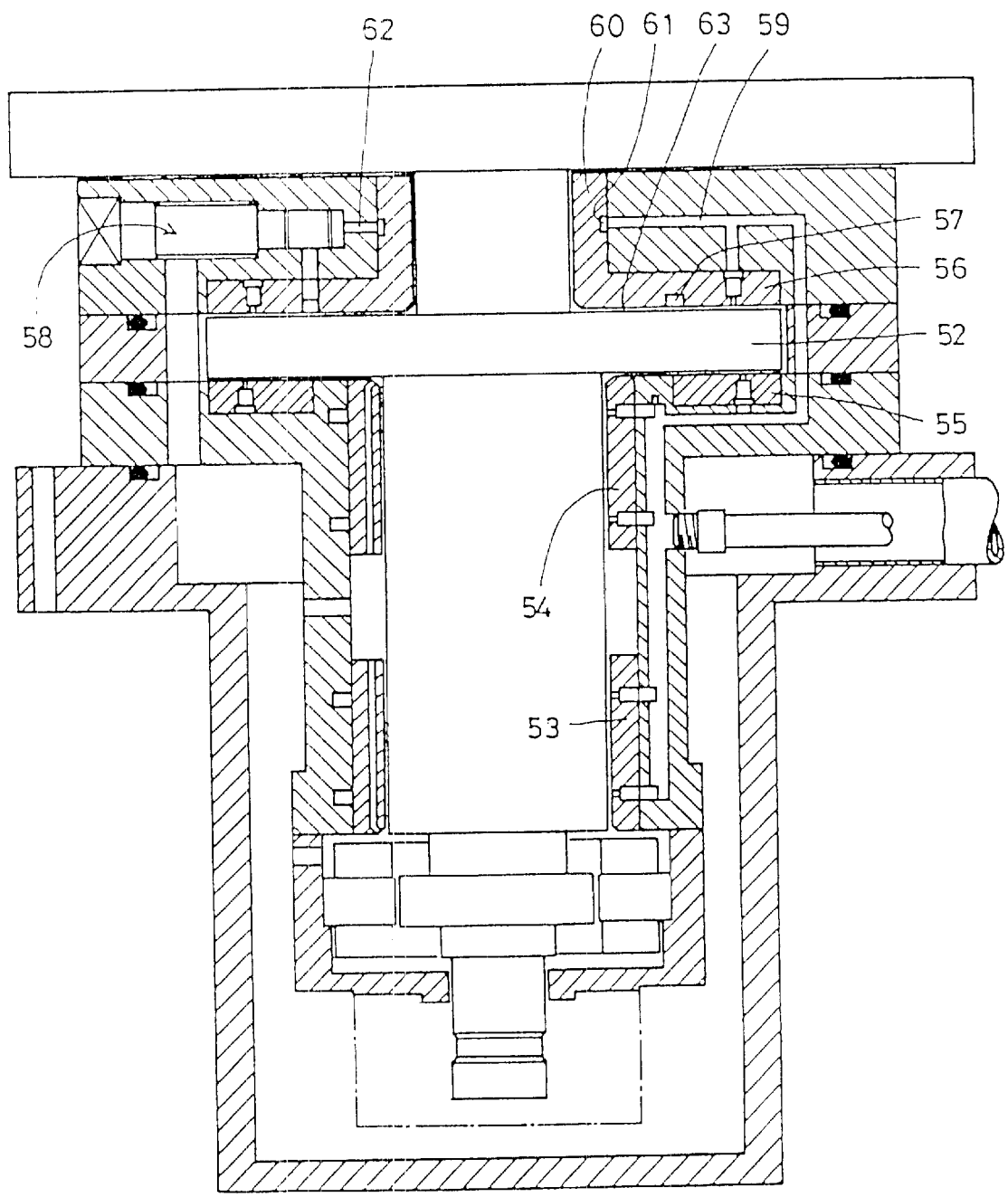

FIG. 7 shows another embodiment in which the rotary shaft 5 carries a thrust plate 52 at its end where a turntable is mounted. The thrust plate 52 has both sides thereof supported by thrust bearings 55, 56 through a bearing gap while being kept out of direct contact with the bearings 55, 56. Similarly, the rotary shaft 5 is radially supported by journal bearings 53, 54 through a bearing gap while being kept out of direct contact with the bearings 53, 54.

Exhaust gas from the bearing gap between thrust bearing 56 and the thrust plate 52 is drawn by a negative pressure generator 58 through an exhaust groove 57 into the atmosphere. Compressed gas is supplied to the nozzle inlet of the negative pressure generator 58 through a passage 59, an annular groove 61 formed in a seal member 60 and a passage 62.

A seal member 60 is integrated with the thrust bearing 56 and fixed to the housing. A seal gap 63 is defined between the top surface of the thrust plate 52 and the bottom surface of the seal member 60 located in the same plane with the thrust bearing surface. Thus, the seal gap 63 which is as narrow as the thrust bearing gap can be easily formed. Gas thus hardly leaks therethrough into the vacuum chamber.

Since the outer portion of the thrust plate forms a thrust bearing, a restoring force against the inclination of the rotary shaft is large. Therefore the thrust plate is less likely to come into direct contact with the bearings 55, 56. Even if it gets into contact with these bearings, it would firstly contact the radially outer portions of the bearings. Thus, the surfaces forming the radially inner seal gaps 63 will never be damaged. Since the outer portions of the thrust bearings are under atmospheric pressure, the thrust bearings or the thrust plate may be formed from a material that shows lubricity in the atmospheric condition, such as graphite, molybdenum disulfide or PTFE, or may be provided with a coating of such a material to improve resistance to damage when the thrust plate and bearings come into contact with each other.

The above-mentioned embodiments aim to achieve high-accuracy rotation in a vacuum atmosphere. But the arrangements according to the present invention are applicable to cases where the spindle assembly is used in a special atmosphere such as gas and the amount of exhaust from the gas bearing to the environment has to be minimized.

Figure 8:
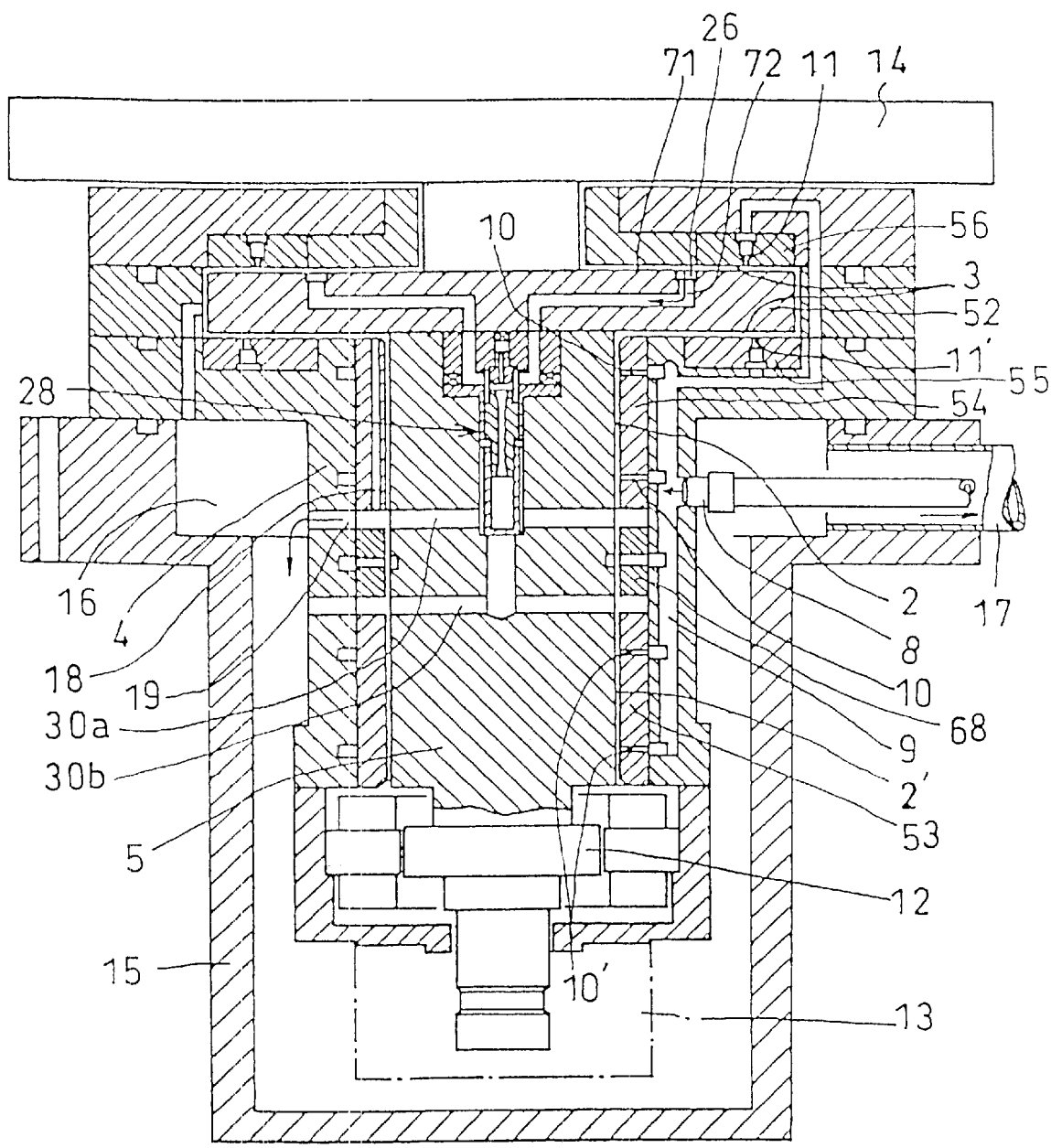
Figure 9:
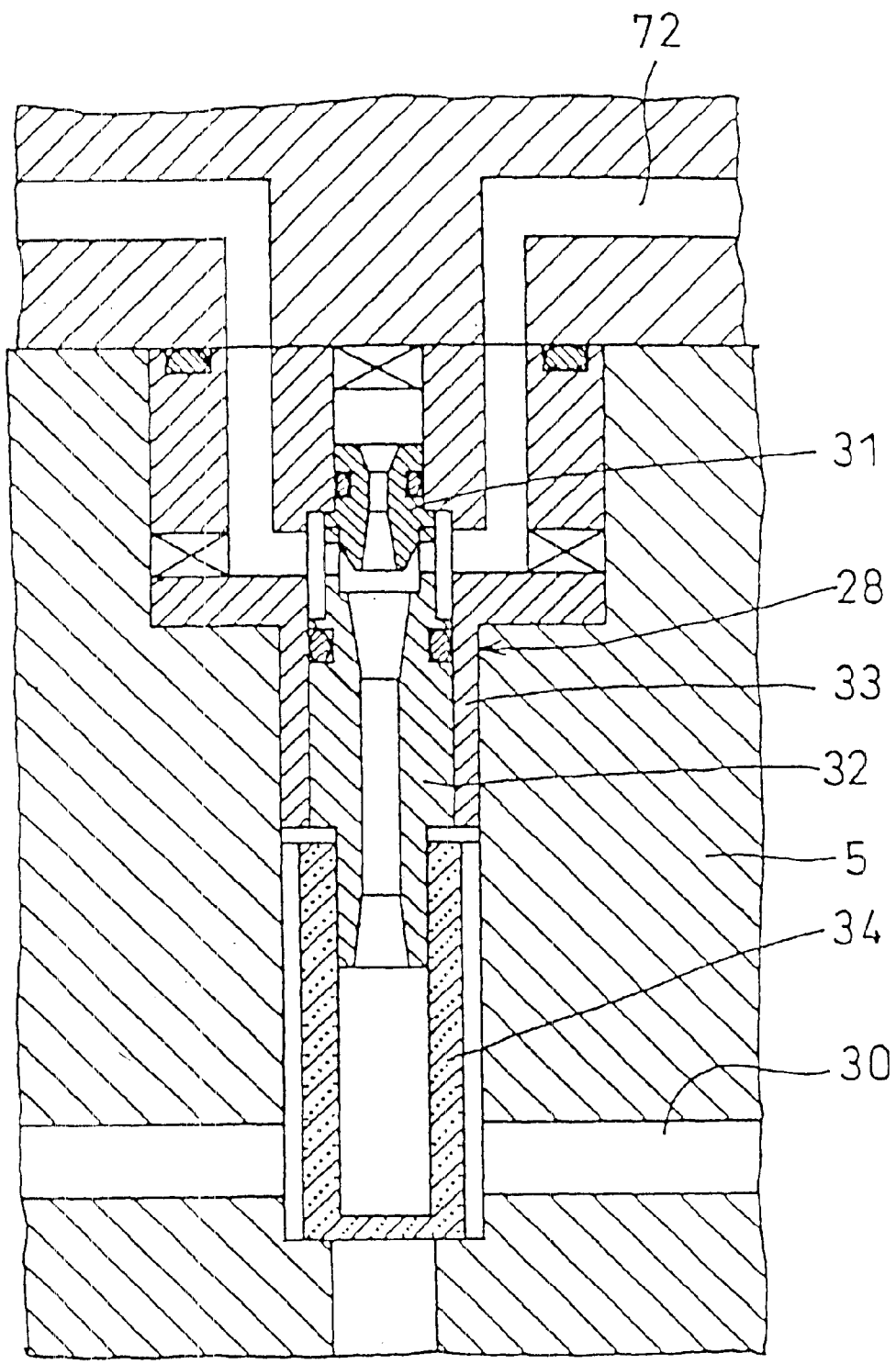
FIG. 9 is an enlarged view of the negative pressure generator mounted in the spindle assembly of FIG. 8.
Figure 10:
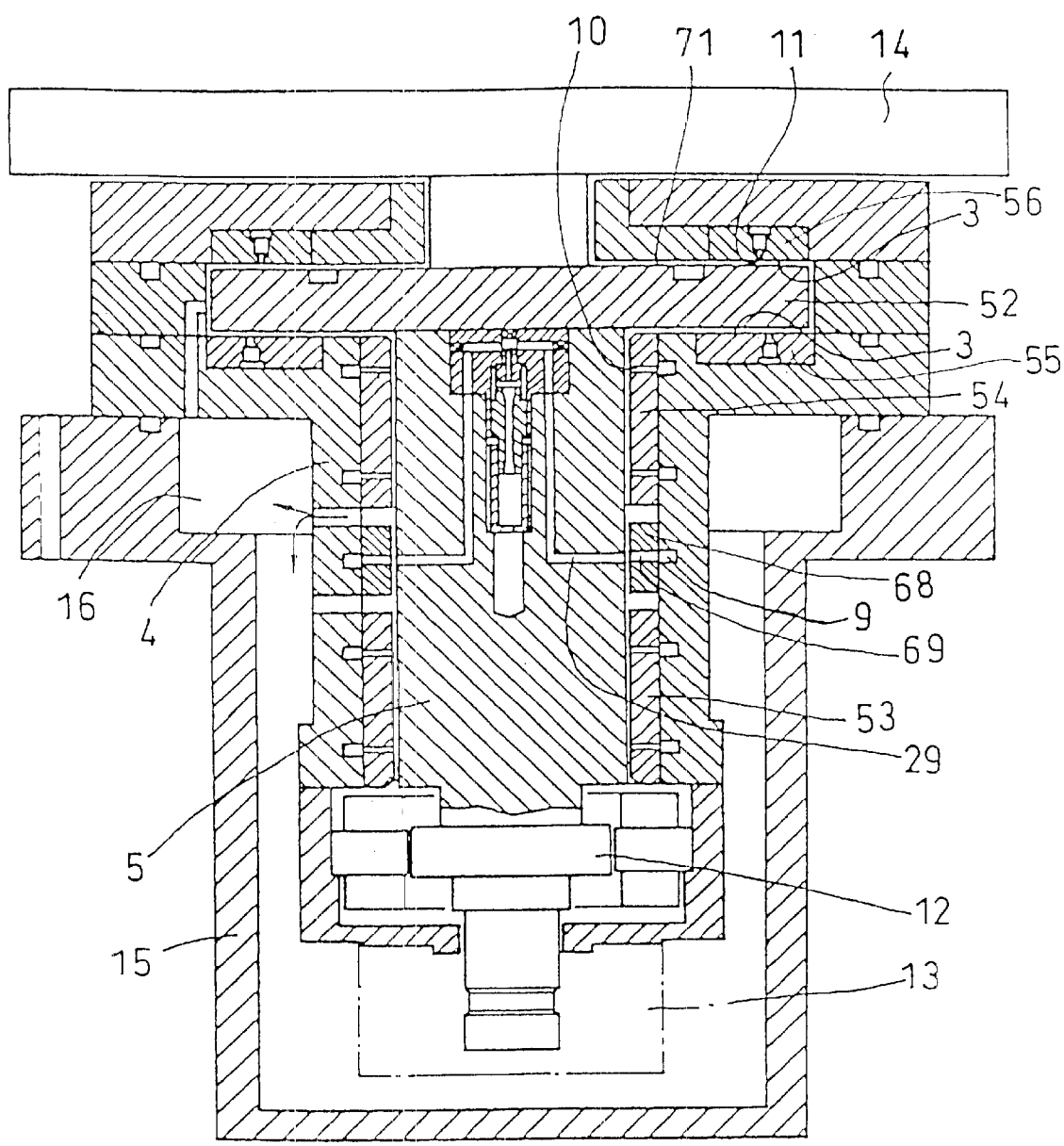
FIG. 10 is a different sectional view of the embodiment of FIG. 8.

FIGS. 8–10 show a further embodiment of the spindle assembly with gas bearing.

In this embodiment, like the embodiment of FIG. 7, a thrust plate 52 is provided on the side of the turntable, and thrust bearings 55, 56 are provided on both sides thereof to support the rotary shaft in a non-contact manner in cooperation with the journal bearings 53, 54.

The exhaust gas leaking from the radially inner periphery of the thrust bearing 56 on the vacuum chamber side passes through an annular exhaust groove 26 and a suction passage 72 formed in the thrust plate 52 and is sucked and discharged by the negative pressure generator 28 mounted in the rotary shaft 5. The amount of bearing exhaust gas leaking to the vacuum chamber side from the exhaust groove 26 is limited by a seal gap 71.

FIG. 9 is an enlarged view of the negative pressure generator 28 mounted in the rotary shaft 5. It includes a case 33 embedded in the rotary shaft 5, a nozzle 31 and a diffuser 32 mounted in the case 33 through O-rings, and a silencer filter 34 provided at one end of the case 33.

As shown in FIG. 10, part of compressed gas supplied into the bearing gas supply passage 9 from the bearing gas supply port 8 flows into a passage 69 formed in a non-contact seal member 68 provided between the two bearing sleeves 53, 54, and is supplied into the nozzle 31 of the negative pressure generator 28 through a non-contact seal portion formed by an extremely small gap (several to several hundred micrometers) which is substantially equal to the size of the bearing gap and through the gas supply passage 29 for the negative pressure generator.

When compressed gas is injected from the nozzle 31 toward the diffuser 32, a negative pressure portion is generated around the injection port of the nozzle 31. The negative pressure portion is connected through the suction passage 72 to an annular exhaust groove 26 outside of the seal gap 71. Thus, the bearing exhaust is discharged into the exhaust space 16 through the exhaust passage 30a, 30b as shown in FIG. 8 together with the compressed gas supplied to the negative pressure generator.

In this embodiment, since the gas supply passage 69 on the housing side for supplying compressed gas to the negative pressure generator 28 is provided between two journal bearings 53, 54, when compressed gas flows into the rotary shaft 5 from the gas supply passage 69, even if there is a turbulence in the flow of gas, it is possible to suppress vibration of the rotary shaft. Thus, high rotational accuracy, which is the main feature of an externally pressurized gas bearing spindle assembly, will not deteriorate.

The function of suppressing vibration of the rotary shaft 5 can be explained with reference to a model shown in FIG. 11, which is simplified for the case where external forces act on a shaft supported by two bearings.

Figure 11:
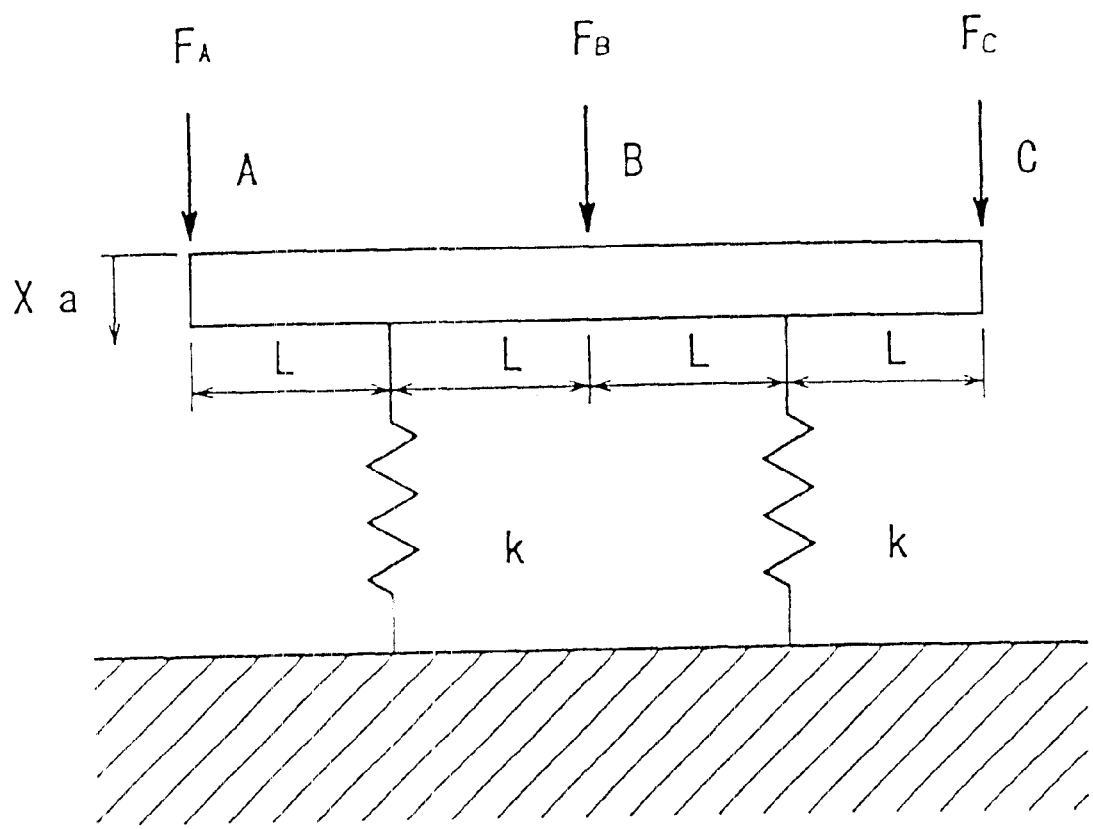
FIG. 11 is a simple model showing a case in which an external force is applied to a rotary shaft supported by the bearing.

In the model of FIG. 11, the bearings are represented by springs and their bearing stiffness (or spring constants) and the distance between the bearings are denoted K and 2L, respectively.

The displacement Xa of point A when only external force $F_A$ acts on point A is expressed by:

$$Xa = 5F_A/2A$$

On the other hand, displacement Xa of point A when only external force Fc acts on point C is expressed by:

$$Xa = -3F_C/2K$$

In contrast, displacement Xa of point A when only external force $F_B$ acts on point B is expressed by:

$$Xa = F_B/2K$$

If $F_A = F_B = F_C = F$, then displacement Xa of point A when external force $F_B$ acts on point B is minimum.

That is to say, if external forces act on a shaft supported by bearings, depending upon the relation between the bearing-supporting positions and the point on which external force acts, displacement of the shaft differs widely.

When an externally pressurized gas bearing spindle assembly is used for precise working, since a workpiece is ordinarily mounted on the end of the shaft, it is important to suppress displacement of the end of the shaft due to vibration of the shaft.

Thus, when compressed gas is supplied into the negative pressure generator, as shown in FIG. 10, by arranging the position of the gas supply passage between the two journal bearings 53, 54, it is possible to effectively suppress vibration of the shaft.

The built-in negative pressure generator 28 in the rotary shaft 5 eliminates the need for an external discharge pump. It is thus possible to reduce the size and cost of the entire assembly. Also, since a tube connecting the exhaust portion with a pump outside the vacuum chamber is not needed, the positioning accuracy is kept high.

Vibration and noise caused by injection flow from the nozzle 31 in the negative pressure generator 28 is reduced by the silencer filter 34 and O-rings. Thus it is possible to minimize the runout of the rotary shaft 5. The silencer filter 34 may be formed from an air-permeable porous sintered metal, porous resin material or a mass of synthetic fiber, and should be preferably made of a resilient material to resiliently support the negative pressure generator 28 and thus to further reduce vibrations.

In the embodiments of FIGS. 8–10, since the gas bearing portion 3 is provided radially outwardly of the seal gap 71 of the thrust plate 52, it provides a greater restoring force against the inclination of the rotary shaft 5. Thus, the thrust plate 6 is less likely to come into contact with the stationary part. Also, since the seal gap and bearing gap are provided practically in the same plane, even if the rotary shaft 1 inclines and the thrust plate 6 comes into contact with the stationary part, the surfaces forming the seal gap would not contact together and thus would never be damaged. The thrust plate 6 or the bearing portion 3 opposing it may be formed from a lubricative material used in the atmosphere such as graphite, molybdenum disulfide or PTFE or may be provided with a coating containing such a material to further improve durability against contact.

Figure 12:
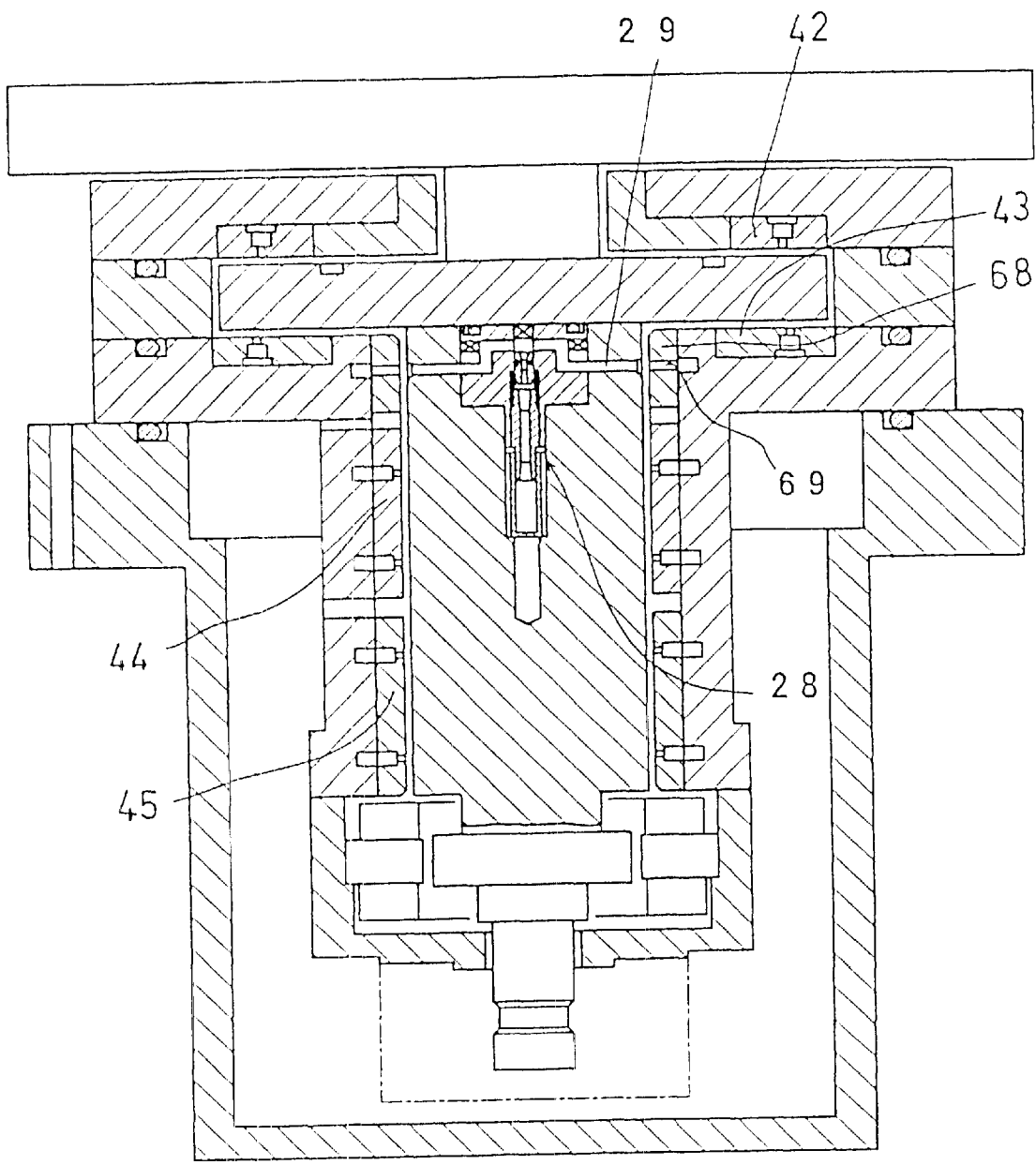
FIG. 12 is a sectional view of a modified example of the embodiment of FIG. 8.

FIG. 12 is a modified example of the embodiment of FIGS. 8–10.

In this example, part of the compressed gas supplied into the bearing gas supply passage from the bearing gas supply port flows into the passage 69 formed in a non-contact seal member 68, and is supplied into the nozzle of the negative pressure generator 28 through a non-contact seal portion formed by an extremely small gap which is substantially equal to the size of the bearing gap and through the gas supply passage 29.

As shown in FIG. 12, even if the gas supply passage 69 is provided between the journal bearing 44 and the thrust bearing 43, if the angular stiffness of the thrust bearing is sufficient, it is possible to suppress vibration of the rotary shaft as in the embodiment of FIGS. 8–10.

Also, even if the positional relation between the gas bearings and the gas supply passage for the negative pressure generator is other than the arrangement of FIG. 8 or 12, if a passage for supplying compressed gas into the negative pressure generator in the rotary shaft and the portion through which compressed gas flows from the housing into the rotary shaft are provided between the bearings, it is possible to suppress vibration of the rotary shaft as in the previous embodiments.

Figure 13:
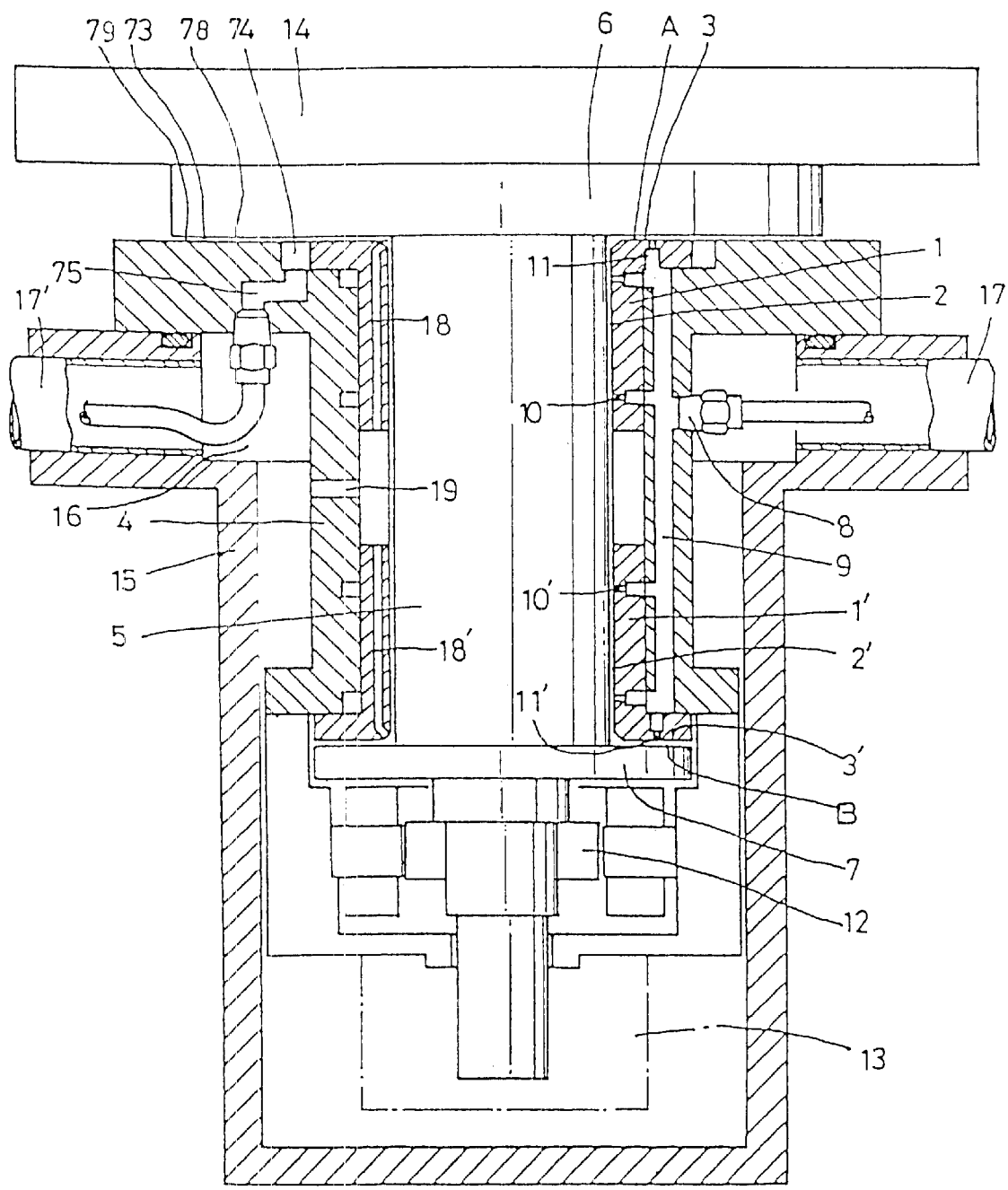
FIG. 13 is a sectional view of another embodiment of the spindle assembly.

FIG. 13 shows a further embodiment of the present invention.

The coaxially arranged bearing sleeves 1, 1' have stationary journal bearing surfaces 2, 2' on radially inner surfaces thereof, and stationary thrust bearing surfaces 3, 3' on end faces, respectively, and are fixed to the housing 4. The rotary shaft 5, which is received in the bearing sleeves 1, 1', carries thrust plates 6, 7 on top and bottom ends thereof to form a rotary member.

Through narrow bearing gaps, the radially outer surface of the rotary shaft 5 opposes the journal bearing surfaces 2, 2', and the end faces of the thrust plates 6, 7 oppose the thrust bearing surfaces 3, 3' to form rotary side bearing surfaces.

When compressed gas is supplied from a bearing gas supply port 8, it is injected into the bearing gaps through the gas passage 9 formed in the housing 4 and orifices 10, 10', 11, 11' formed in the sleeves 1, 1' to support the rotary member while keeping it out of contact with the stationary parts.

The rotary shaft 5 carries a rotor 12 of an electric motor and is rotated with high accuracy by the motor based on signals from a rotation angle detector 13. The thrust plate 6 carries a turntable 14 on which is mounted a workpiece.

The housing 4 is airtightly mounted to the airtight case 15. The exhaust space 16 defined between the housing 4 and the airtight case 15 communicates with the outside of the vacuum chamber, in which the spindle is placed, through the bellows joints 17. The exhaust gas flowing into the space 16 through exhaust passages 18, 18', 19 is discharged out of the vacuum chamber through the bellows joints 17, 17'. The thrust plate 6 and the turntable 14 are exposed to a vacuum atmosphere in the vacuum chamber. The bellows joints 17, 17' also serve as a passage through which bearing gas tubes, motor cable and cable for the angle detector are introduced from outside the chamber.

Radially outwardly of and near the thrust bearing surface 3, the thrust plate 6 is formed with a seal surface 78 which defines a seal gap 73 in cooperation with a seal surface 79 formed on the housing 4.

Formed along the radially outer edge of the thrust bearing surface 3 is an annular exhaust groove 74 communicating with an external discharge pump (not shown) through an exhaust passage 75.

Figure 14A:
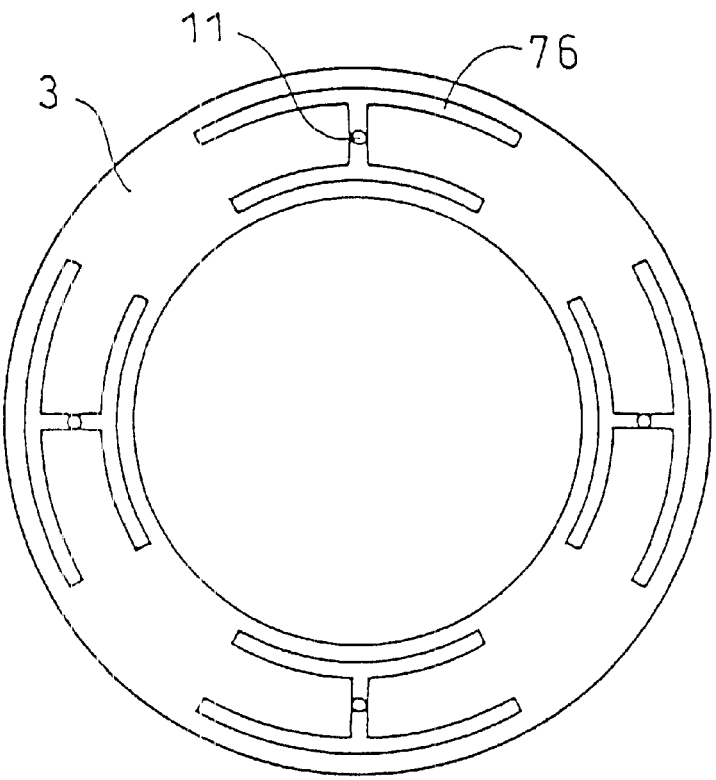
FIG. 14 shows stationary side thrust bearing surfaces 3, 3' in the embodiment of FIG. 12.
Figure 14B:
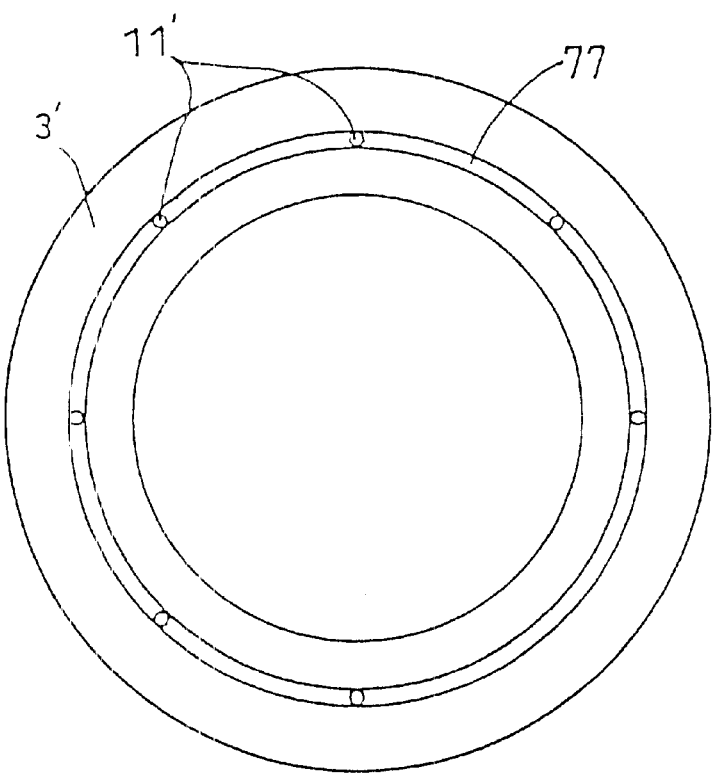

FIGS. 14A and 14B show the thrust bearing surfaces 3 and 3' at the turntable and motor sides, respectively. Shallow grooves 76, 77 and orifices 11, 11' are provided on these thrust bearing surfaces 3, 3' respectively. The grooves 76 and 77 have a depth one to 15 times the size of the bearing gap.

The diameters and numbers of the orifices 11, 11' and the depths and patterns of the grooves 76, 77 are determined such that the bearing gap A of the thrust bearing on the turntable side, will be smaller than the bearing gap B of the opposite thrust bearing and the thrust bearing on the turntable side is more stiff than the opposite thrust bearing by e.g. reducing the number and/or diameter of the orifices 11 of the thrust bearing on the turntable side or reducing the depth of groove 76 in comparison with the opposite thrust bearing.

In a conventional arrangement, the two thrust bearings were of the same design, so that the bearing gaps A, B were of the same size, that is, half the difference between the distance between the thrust plates 6, 7 at the rotary member side and the distance between the thrust bearing surfaces 3, 3' formed on the stationary member. In the arrangement of the present invention, the thrust bearing gap A at the turntable side is made smaller than half the abovementioned difference. Since the seal surface 79 is provided integral and flush with the thrust bearing surface 3 particularly in the embodiment of FIG. 13, they can be machined simultaneously. They can thus be formed accurately. This makes it possible to form an extremely narrow seal gap 73 compared with a conventional arrangement.

Since the thrust bearing on the turntable side is more stiff than the opposite thrust bearing, any change in dimensional difference due e.g. to thermal expansion will be absorbed for the most part in the form of change in the bearing gap B at the motor side with the gap A at the turntable side remaining practically unchanged. Because the seal member is arranged near the thrust bearing surface 3 at the turntable side and the seal gap 73 changes with the thrust bearing gap A at the turntable side, the change in the seal gap 73 is small. Thus, narrow seal gaps and bearing gaps can be maintained more stably than in the conventional arrangement.

The gas flow rate through the seal gap 73 is proportional to the cube or square of the size of the gap for continuous flow and molecular flow, respectively. Since the seal gap 73 of the invention can be made narrower than a conventional seal, leakage of gas can be reduced. Since the bearing gap A is equally narrow, the amount of exhaust gas flowing into the exhaust groove 74 from the thrust bearing gap A decreases. Improved seal performance and reduction in amount of exhaust gas make it possible to reduce the number of exhaust grooves and thus to simplify the external exhaust device.

Depending upon the permissible leakage level from the spindle, instead of connecting the exhaust groove 74 to an external exhaust device as in the embodiment of FIG. 13, exhaust may be discharged through a small exhaust gas suction means built in the spindle. Or such an exhaust gas suction means may be omitted altogether. If no exhaust gas suction means is used, the exhaust passage may be connected to the space between the airtight case and the housing.

Figure 15:
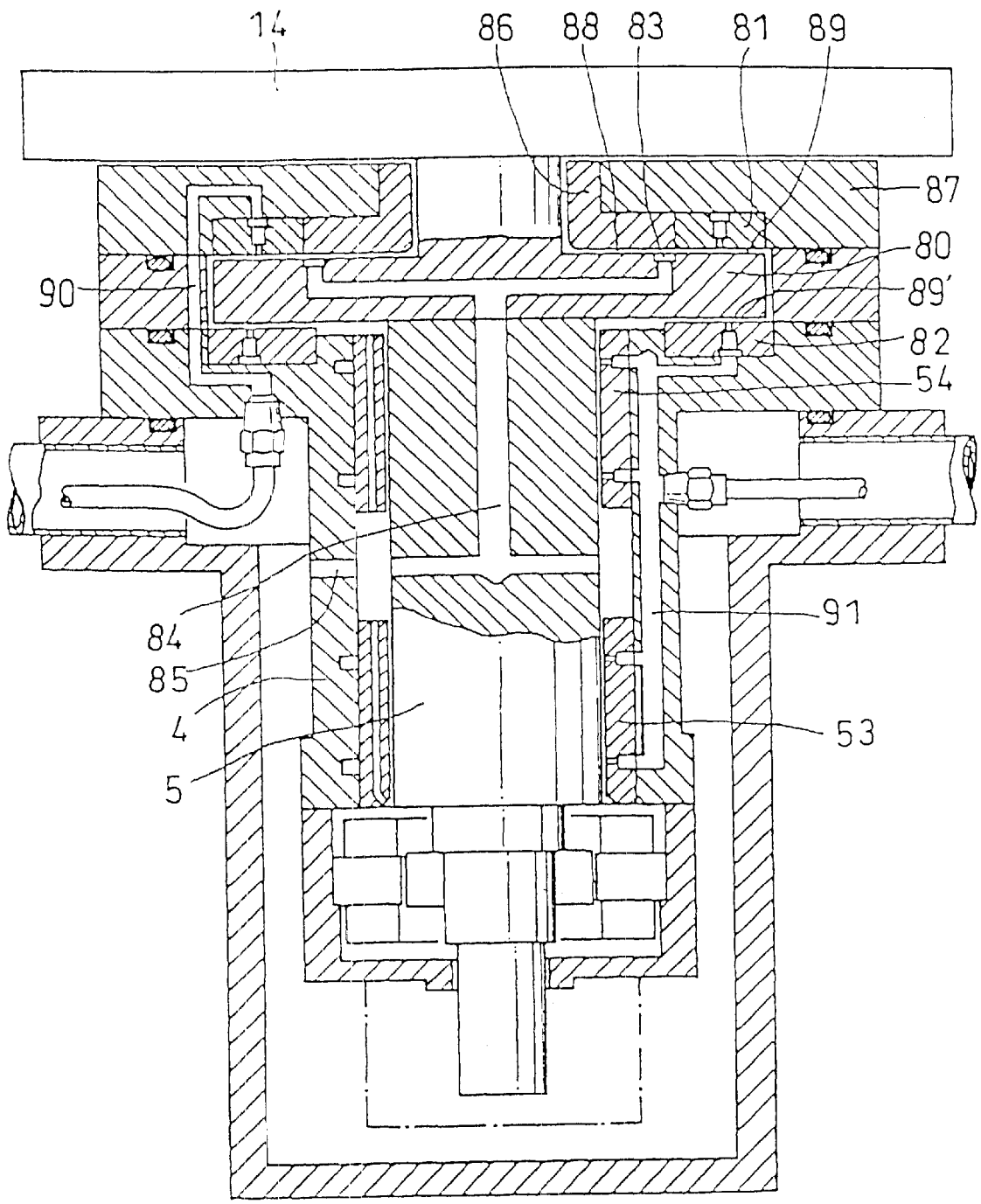
FIGS. 15–17 are sectional views of spindle assemblies of various other embodiments.

FIG. 15 shows a modification of the embodiment of FIG. 13, in which a thrust plate 80 is mounted only to the end of the rotary shaft near the turntable 14 with thrust bearings 81 and 82 provided on both sides of the thrust plate 80. The thrust bearings 81, 82 support the rotary shaft 5 while keeping it out of contact with the stationary members in cooperation with journal bearings 53, 54. Bearing exhaust from the inner periphery of the thrust bearing 81 is discharged through an exhaust groove 83, a passage 84 formed in the rotary shaft 5 and an exhaust passage 85 formed in the housing 4 into an atmospheric space defined between the housing 4 and the airtight case 15. A seal member 86 is fixed to a thrust bearing housing 87 together with the thrust bearing 81. Its surface forming a seal gap 88 is flush with the bearing surface of the thrust bearing 81.

Like the embodiment of FIG. 13, by suitably selecting the number and diameter of the gas supply holes and the groove pattern and depth, the bearing reaction forces can be balanced with a thrust bearing gap 89 smaller than a thrust bearing gap 89'. In this embodiment of FIG. 15, the thrust bearing 82 is given a greater bearing area than the thrust bearing 81 at the turntable side to further increase the difference between the bearing gaps 89 and 89'.

Compressed gas is supplied to the thrust bearing 81 and the other bearings through separate passages 90 and 91, respectively, and separate pressure adjustors, so that the seal gap can be adjusted to an optimal value according to the operating conditions such as atmospheric pressure and load.

Since the thrust bearings are provided at a radially outer portion of the thrust plate 80, they offer a greater restoring force against the inclination of the rotary shaft 5 and thus the thrust plate 80 is less likely to come into direct contact with the bearings 81, 82. Even if the rotary shaft gets into contact with the stationary member, it firstly contacts at the radially outer portion of the thrust bearings 81, 82. Thus, the radially inner surfaces forming the seal gap 88 will never be damaged because they do not contact each other. Since the thrust bearings and the thrust plate are under the atmospheric pressure, they may be formed from a material having lubricity under atmospheric conditions such as graphite, molybdenum disulfide or PTFE, or may be provided with a coating of such a material to improve resistance to damage when they come into contact with each other.

Figure 16:
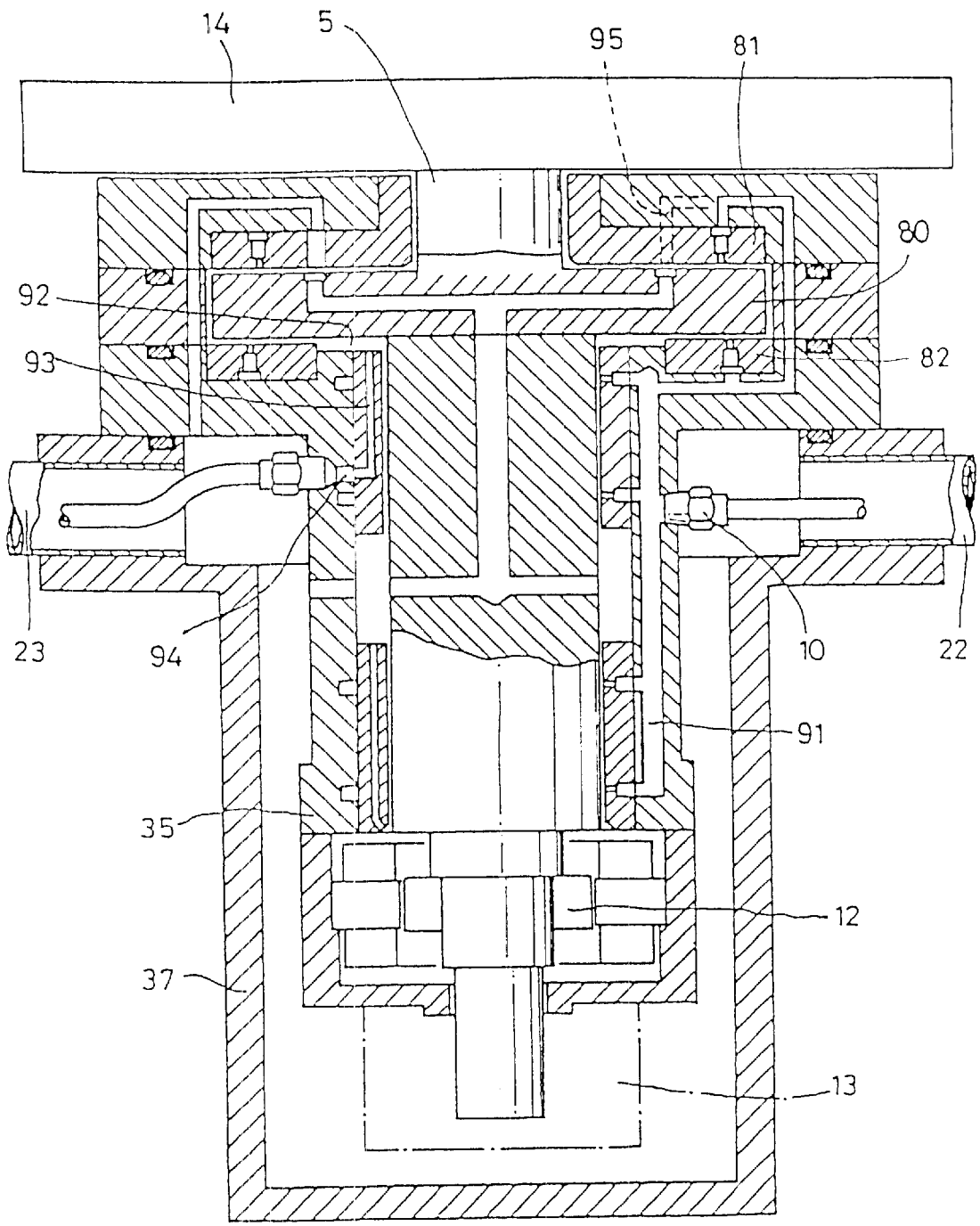

FIG. 16 shows a modified embodiment, which is basically of the same structure as the embodiment of FIG. 15. But in this embodiment, compressed gas is supplied to both thrust bearings 81 and 82 through a common passage 91.

From a gas supply passage 94 which is separately provided from the gas supply passage to the bearing, compressed gas is introduced into a pressure chamber 92 defined radially inside of the thrust bearing through a passage 93 and a pressure adjustor. This results in the force acting from the pressure chamber 92 to the thrust plate 80 and the pressure rise at the portion inside of the thrust bearing 82, thus causing the rotary portion to displace toward the seal side. This further reduces the seal gap.

A displacement sensor 95 may be provided on or near the seal surface to measure the seal gap. Thus, based on signals from the sensor 95, it is possible to adjust the seal gap to a constant size by controlling the gas supply pressure to the pressure chamber 92 either electronically or manually.

Figure 17:
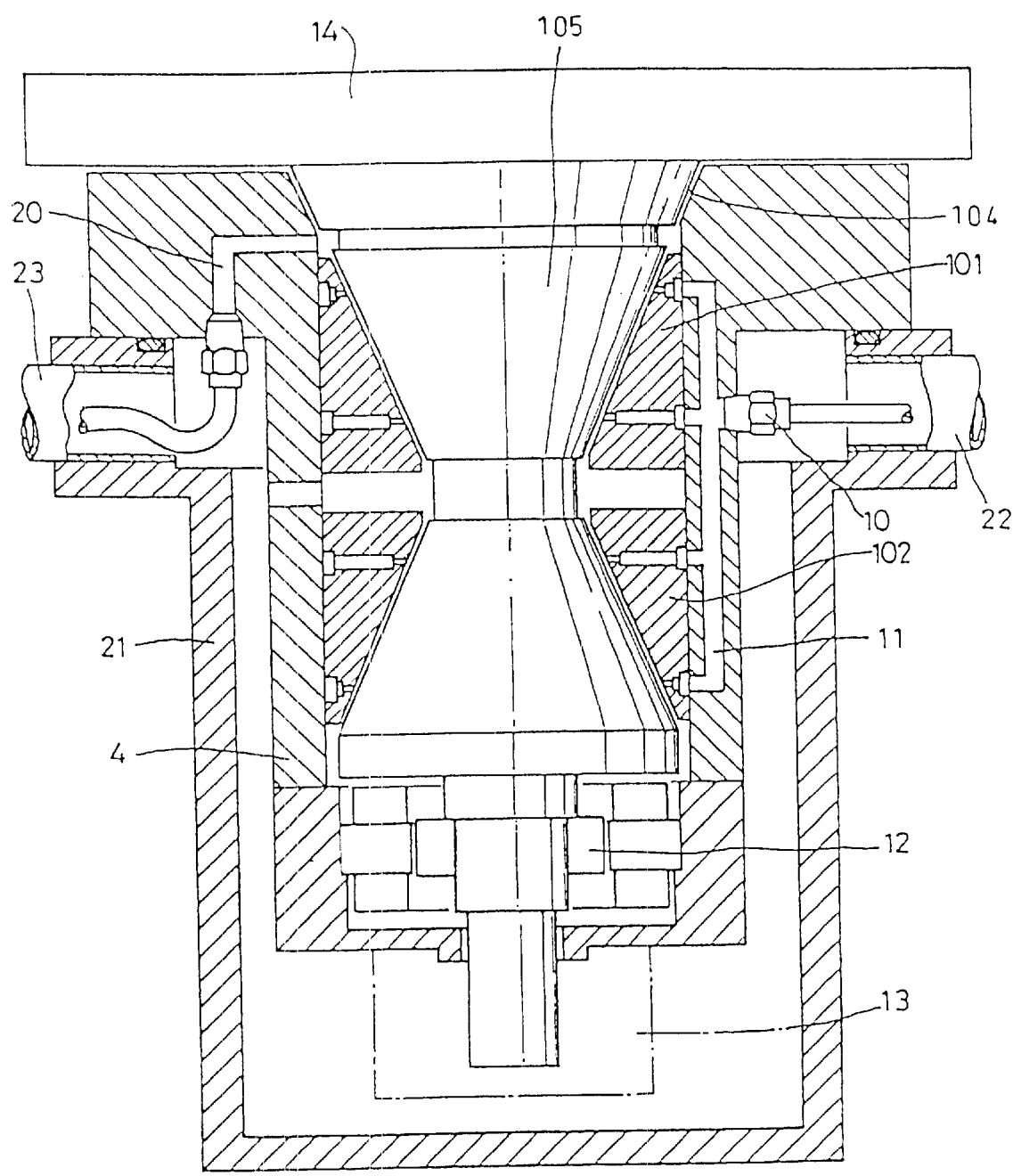

FIG. 17 shows a further modified embodiment in which two tapered bearings 101, 102 support a rotary shaft 105 radially and axially. A seal surface 104 is provided in alignment with the bearing surface of the bearing 101.

In the embodiments of FIGS. 13 to 17, because the spindle is in a vacuum, an airtight case and a bellows joint are needed. But the bearing assembly can be used with only its portion including the turntable disposed in the vacuum chamber and the remaining portion including the motor exposed to the atmosphere. In such a case, the motor cable and the air supply and exhaust hoses can be introduced through the housing directly to the atmosphere.

The bearing assembly according to this invention can be used in a special gas atmosphere in which discharge of gas used to support the rotary member into the ambient gas, and entry of the ambient gas into the bearing portion are not desirable.

In the aforesaid embodiments, externally pressurized gas bearings fed through orifices and shallow grooves are used. But difference in the size of the bearing gaps may be created by other gas restricting means. For example, compressed gas may be supplied through porous members having different gas permeability or through slots having different sizes to the respective bearing gaps. If porous members are used, their gas permeability is controlled by adjusting the degree of surface clogging or the permeability of their raw material.

Although a single annular exhaust groove is provided in the embodiments of FIGS. 5 to 17, a plurality of annular concentric exhaust grooves may be provided like the embodiment of FIG. 1 or 3 and conventional arrangements. In this case, the exhaust groove nearest to the seal gap may be connected to the atmospheric space defined between the airtight case and the housing with any other exhaust grooves connected to an exhaust suction device.

This arrangement allows use of a smaller, less expensive exhaust suction device compared with the case in which the bearing exhaust is directly sucked and discharged.

According to this invention, as described above, it is possible to increase the degree of vacuum attained in the vacuum chamber without extremely narrowing the non-contact seal gap while suppressing the number of exhaust pumps outside the vacuum chamber or without requiring severe accuracy of parts even if the non-contact seal gap is made narrow.

What is claimed is:

1. A spindle assembly with a bearing portion, said spindle assembly comprising a housing, a rotary shaft rotatably mounted in said housing through a bearing gap, said rotary shaft being supported in a non-contact manner by compressed gas supplied into said bearing gap, and an exhaust gas suction device provided in said housing for sucking gas discharged from said bearing gap, wherein said exhaust gas suction device comprises a negative pressure generator which produces a negative pressure by the flow of compressed gas.

2. The spindle assembly claimed in claim 1 wherein said rotary shaft is supported in said housing by a plurality of externally pressurized gas bearings, wherein said negative pressure generator is provided inside said rotary shaft, wherein gas supply passages for supplying compressed gas into said negative pressure generator are arranged in said housing and said rotary shaft to allow compressed gas to flow from said housing into said rotary shaft through a portion disposed between said gas bearings.

3. The spindle assembly as claimed in claim 2 wherein said portion is enclosed by a non-contact seal part.

4. The spindle assembly as claimed in claim 3 wherein said non-contact seal part has rotary and stationary side seal surfaces, at least one of which is formed from a lubricious material.

5. The spindle assembly as claimed in claim 2 wherein a passage for discharging gas is provided between said portion and one of said gas bearings.

6. The spindle assembly as claimed in claim 1 wherein a passage for introducing compressed gas to said bearing gap communicates with a passage for supplying compressed gas into said negative pressure generator.

7. The spindle assembly as claimed in claim 1 further comprising a first non-contact seal gap and a second non-contact seal gap provided between said rotary shaft and a stationary portion provided around said rotary shaft along the flow of gas discharged from a gas discharge end of said bearing gap, a first exhaust groove formed between said gas discharge end and said first non-contact seal gap, and a second exhaust groove formed between said first and second non-contact seal gaps to form a labyrinth seal, said first exhaust groove communicating with an outside of said spindle assembly, said second exhaust groove communicating with said exhaust gas suction device.

8. The spindle assembly as claimed in claim 7 further comprising at least one additional non-contact seal gap at an exhaust end of said second non-contact seal gap, and a third exhaust groove formed between said second and additional seal gaps, said third exhaust groove communicating with a discharge pump provided outside said spindle assembly.

9. The spindle assembly as claimed in claim 1 further comprising a first non-contact seal gap and a second non-contact seal gap provided between said rotary shaft and a stationary portion provided around said rotary shaft along the flow of gas discharged from a gas discharge end of said bearing gap, a first exhaust groove formed between said gas discharge end and said first non-contact seal gap, and a second exhaust groove formed between said first and second non-contact seal gaps to form a labyrinth seal, said first exhaust groove communicating with said exhaust gas suction device, said second exhaust groove communicating with an exhaust pump provided outside said spindle assembly.

10. A spindle assembly with a bearing portion, said spindle assembly comprising a housing, a rotary shaft rotatably mounted in said housing through a bearing gap, said rotary shaft being supported in a non-contact manner by compressed gas supplied into said bearing gap, and an exhaust gas suction device provided in said housing for sucking gas discharged from said bearing gap, wherein said bearing portion is provided with a journal bearing at a position nearest to its exhaust end, wherein a non-contact seal gap is provided between said rotary shaft and a stationary portion provided around said rotary shaft, wherein an exhaust groove is formed between said gas discharge end and said non-contact seal gap, wherein said exhaust groove and said seal gap are aligned with each other in an axial direction, and wherein circumferential surfaces forming said seal gap have an inner diameter equal to, or smaller than, that of said journal bearing.

11. A spindle assembly with a bearing portion, said spindle assembly comprising a housing, a rotary shaft rotatably mounted in said housing through a bearing gap, said rotary shaft being supported in a non-contact manner by compressed gas supplied into said bearing gap, and an exhaust gas suction device provided in said housing for sucking gas discharged from said bearing gap, wherein a thrust bearing is provided at an exhaust end of a bearing portion, and a seal gap is provided at an extension of a bearing gap of said thrust bearing.

12. The spindle assembly as claimed in claim 11, wherein said thrust bearing includes rotary and stationary side bearing surfaces with a bearing gap therebetween, wherein said seal gap is provided radially inwardly of said thrust bearing, and wherein at least one of said bearing surfaces is formed of a lubricious material.

13. A spindle assembly with a bearing portion, said spindle assembly comprising a housing, a rotary shaft rotatably mounted in said housing through a bearing gap, said rotary shaft being supported in a non-contact manner by compressed gas supplied into said bearing gap, and an exhaust gas suction device provided in said rotary shaft for sucking gas discharged from said bearing gap.

14. The spindle assembly of claim 13 wherein said exhaust gas suction device comprises a negative pressure generator which produces a negative pressure by the flow of compressed gas.

15. The spindle assembly as claimed in claim 14 wherein a passage for introducing compressed gas to said bearing gap communicates with a passage for supplying compressed gas into said negative pressure generator.

16. The spindle assembly as claimed in claim 13 further comprising a first non-contact seal gap and a second non-contact seal gap provided between said rotary shaft and a stationary portion provided around said rotary shaft along the flow of gas discharged from a gas discharge end of said bearing gap, a first exhaust groove formed between said gas discharge end and said first non-contact seal gap, and a second exhaust groove formed between said first and second non-contact seal gaps to form a labyrinth seal, said first exhaust groove communicating with an outside of said spindle assembly, said second exhaust groove communicating with said exhaust gas suction device.

17. The spindle assembly as claimed in claim 16 further comprising at least one additional non-contact seal gap at an exhaust end of said second non-contact seal gap, and a third exhaust groove formed between said second and additional seal gaps, said third exhaust groove communicating with a discharge pump provided outside said spindle assembly.

18. The spindle assembly as claimed in claim 13 further comprising a first non-contact seal gap and a second non-contact seal gap provided between said rotary shaft and a stationary portion provided around said rotary shaft along the flow of gas discharged from a gas discharge end of said bearing gap, a first exhaust groove formed between said gas discharge end and said first non-contact seal gap, and a second exhaust groove formed between said first and second non-contact seal gaps to form a labyrinth seal, said first exhaust groove communicating with said exhaust gas suction device, said second exhaust groove communicating with an exhaust pump provided outside said spindle assembly.

19. The spindle assembly as claimed in claim 13 wherein said bearing portion is provided with a journal bearing at a position nearest to its exhaust end, wherein a non-contact seal gap is provided between said rotary shaft and a stationary portion provided around said rotary shaft, wherein an exhaust groove is formed between said gas discharge end and said non-contact seal gap, wherein said exhaust groove and said seal gap are aligned with each other in an axial direction, and wherein circumferential surfaces forming said seal gap have an inner diameter equal to, or smaller than, that of said journal bearing.

20. The spindle assembly as claimed in claim 13 wherein a thrust bearing is provided at an exhaust end of said bearing portion and a seal gap is provided at an extension of a bearing gap of said thrust bearing.

21. The spindle assembly as claimed in claim 20, wherein said thrust bearing includes rotary and stationary side bearing surfaces with a bearing gap therebetween, wherein said seal gap is provided radially inwardly of said thrust bearing, and wherein at least one of said bearing surfaces is formed of a lubricious material.

* * * * *